Feb. 21, 1950

S. B. BERKELEY 2,498,239

SOUND TRANSMISSION EAR VESTIBULE FOR TELEPHONE CONVERSATION RECORDINGS

Filed Oct. 29, 1948

Inventor:
Scott B. Berkeley

BY Dudley B. Howard
Attorney.

Patented Feb. 21, 1950 2,498,239

UNITED STATES PATENT OFFICE 2,498,239

SOUND TRANSMISSION EAR VESTIBULE FOR TELEPHONE CONVERSATION RECORDING

Scott B. Berkeley, Goldsboro, N. C.

Application October 29, 1948, Serial No. 57,176

4 Claims. (Cl. 179—182)

The invention relates to sound recording apparatus and has particular reference to the recording of telephone conversation by a party to the call.

It is my primary object to improve upon the acoustical telephone connector for sound recorders disclosed in my co-pending application Ser. No. 38,683, filed July 14, 1948, which issued as Patent No. 2,479,806 on August 23, 1949. In accordance with the invention disclosed therein, a small sound transmission device is adapted to be carried about with a portable sound recorder for use when the occasion demands to establish an acoustical connection between the transmitter microphone of the sound recorder and a telephone receiver. The transmission device, or "connector body" as it is called, has means by which it can be readily attached to both the recorder microphone and the telephone receiver. An alternate earpiece is provided on the connector body and is placed against the user's ear when telephoning. Internal sound conducting channels connect the telephone receiver with the recorder microphone and alternate earpiece through the medium of a focal sound chamber centrally located in the connector.

Functionally, my prior model whose essential elements have just been enumerated is quite satisfactory, but there are disadvantages in the intended mode of use wherein the connector body and attached recorder microphone are connected to, and supported by, the telephone receiver. In the first place, the receiver supports so much extra weight that it becomes very tiring to hold it in the position of use throughout an extended call. Also, if the receiver be incorporated with the transmitter in a handset, which is becoming the most generally desired type, the handset will be rendered unbalanced. Difficulty has been encountered in balancing the handset on the supporting cradle when not in use; and, when held in the customary position of use, the handset is quite topheavy.

With the object of improving upon my earlier model, I have eliminated the means for attaching the sound transmission body to a telephone receiver and have provided means by which the sound transmission body and attached recorder microphone as a unit may be supported by the head of the user with the alternate earpiece pressing against the ear. In the new mode of use, the sound transmission body becomes a veritable outer vestibule for the ear, against which the unencumbered telephone receiver may be pressed and held with ease in precisely the same manner as if it were placed in direct contact with the user's own ear.

Another object is to provide a head-supported holder for the sound transmission body which is adapted to swivel the latter and thus facilitate even contact of the alternate earpiece against the user's ear.

A further object is to provide specific swiveling means for the sound transmission body which permits of quick detachment and intentional inversion of the said body, and which includes means by which the body may be secured against accidental inversion and may even be set in various angularly adjusted positions with relation to the user's ear and adjacent facial contours for comfort in prolonged use.

Due to provision of the new swivel mounting for the sound transmission body, I am enabled to accomplish an additional object, which is to relieve the user's hand of a great deal of the weight of the telephone receiver, or handset, when in position of use. The sound transmission body as disclosed in my co-pending application has an abutment face provided on the outwardly presented side thereof opposite to the alternate earpiece for abutment against the face annulus or earpiece of the telephone receiver. In order to guide the earpiece of the receiver into proper registration with the seat and to aid the attaching means in maintaining a rigid as well as properly aligned connection between receiver and seat, a pair of arcuate flanges project from the upper edge of the abutment face for contact with the upper marginal surface of the said face annulus. This feature is disclosed also in the present application, but it is practicable with the new swivel mount to invert the sound transmission body and thereby cause the guide flanges to assume new positions wherein they project from beneath the receiver seat instead of above the same and serve as a ledge upon which the face annulus may rest. When advantage is taken of the arrangement just mentioned, the weight of the telephone receiver, or handset, is almost entirely head-supported. Furthermore, it becomes more practicable for a user to clamp the receiver, or handset, between the ear and shoulder in the manner commonly affected when it is desired to free both hands for other use. With the receiver's earpiece resting upon the flange-formed ledge, this feat is much more easily and safely performed.

Still further objects and advantages of the invention will appear from the following description when read in connection with the accompanying drawings, in which.

Figures 1, 2, 3, 4, 5, 6, 7, 8:
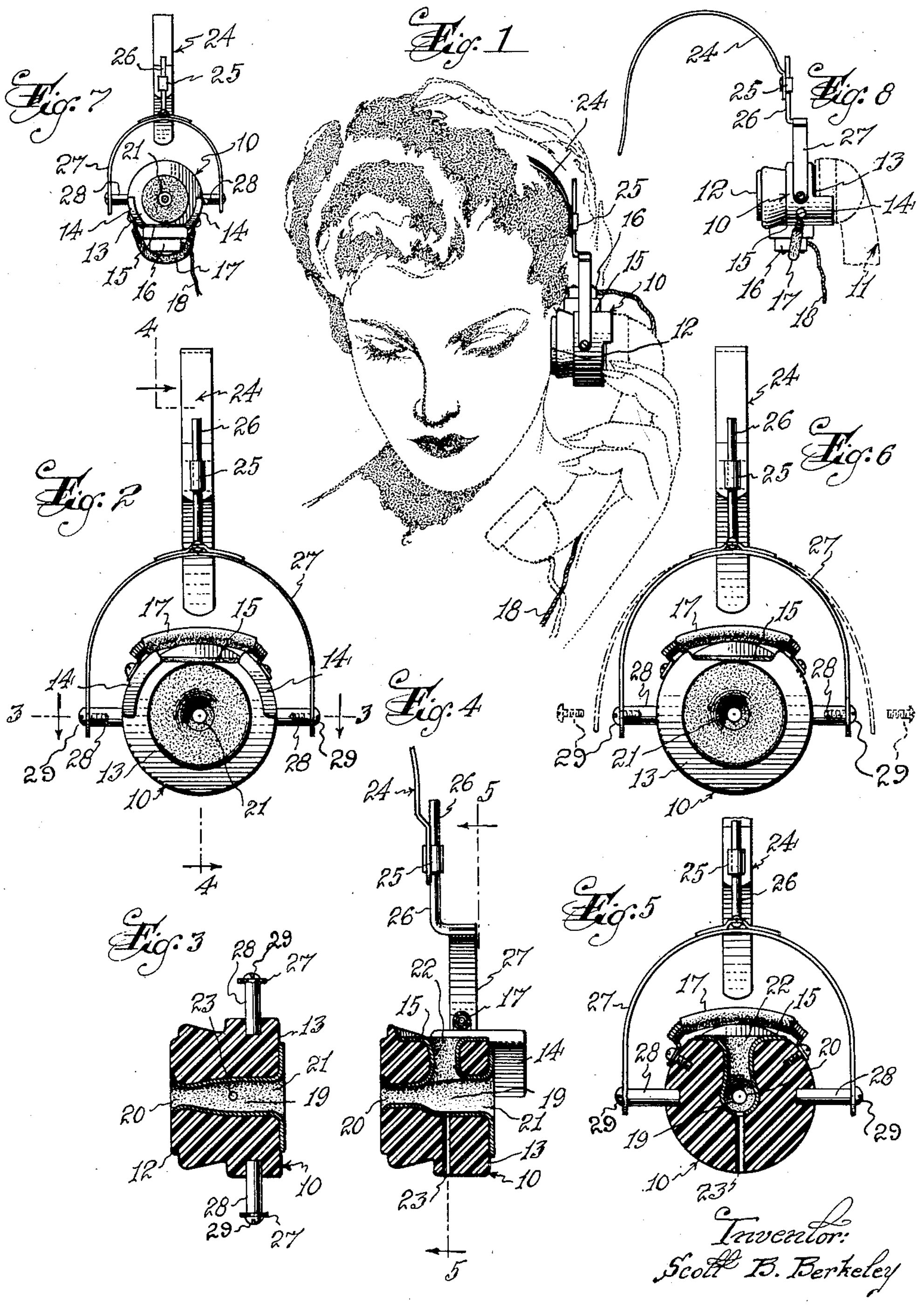
Fig. 1 is a perspective view showing the sound transmission body in head-supported position and in use for recording a telephone conversation.
Fig. 2 is a side elevation of the sound transmission body and head-support means without the recorder microphone, shown on a larger scale.
Fig. 3 is a horizontal sectional view taken on line 3—3 in Fig. 2.
Fig. 4 is a transverse vertical sectional view taken on line 4—4 in Fig. 2, showing the headband broken away.
Fig. 5 is a vertical sectional view taken on line 5—5 in Fig. 4.
Fig. 6 is a side elevation similar to Fig. 2 showing a modified form of sound transmission body which has the guide flanges omitted from the face of the telephone receiver seat, and also showing in broken lines the manner in which the swiveling fork of the head-support means is sprung after removal of the clamping screws to permit detachment of the sound transmission body.

Fig. 7 is a side elevation of the device with the recorder microphone attached, drawn to a smaller scale and showing the sound transmission body inverted in position; and Fig. 8 is a front view of the device as shown in Fig. 7 to include in broken lines a fragmentary representation of a telephone receiver in contact with the seat therefor on the sound transmission body and resting upon the inverted guide flanges.

Referring now to the drawings, in which like characters of reference indicate corresponding parts in the several views, Fig. 1 shows the sound transmission body 10 in its new head-supported condition, wherein it constitutes an outer vestibule for the user's ear, with a telephone handset 11 being held against the said body in the new, completely unconnected relation. Instead of placing the receiver element of the handset in direct contact with the actual ear, it is brought to bear against the outwardly presented face of the body 10, which has thus become a counterpart of the human ear.

As disclosed in Figs. 2, 3, 4 and 5, body 10 is identical in construction with the "connector body" of the earlier embodiment of the invention which is the subject of my co-pending application Ser. No. 38,683. Body 10 preferably is made of resonant material, is circular in cross-section, and has its inwardly presented end face 12 shaped to fit the user's ear, whereas the opposite outwardly presented end face is shaped to fit the standard face annulus or earpiece of a telephone receiver of any type and to form an abutment face 13 therefor. It is preferred to retain the flanges 14 which project from the upper margin of abutment face 13, because they are quite useful in guiding the earpiece of the telephone receiver into properly aligned position on said abutment face under conditions which make it impossible for the user to see the earpiece. However, if it should be desired to omit the flanges, body 10 will appear as shown in Fig. 6. In either case, no means for attaching the telephone receiver to abutment face 13 is provided, as in the earlier embodiment, because manually maintained abutment of the receiver against the body is depended upon entirely in accordance with the new concept.

As in the earlier device, a seat 15 is provided on top of body 10 for application of recorder microphone 16 and the usual expansible attaching loop 17 has its ends attached in suitable manner to body 10 at opposite sides of seat 15. When microphone 16 is seated, attaching loop 17 will embrace the microphone in the manner shown in Figs. 7 and 8. Extension cord 18 is provided to connect microphone 16 to a sound recording instrument (not shown) of any suitable type.

The central sound chamber 19 communicates with alternate earpiece 12 and abutment face 13 of body 10 through axial sound channels 20 and 21 respectively. Sound channel 22 leads upward from chamber 19 to microphone seat 15. Atmospheric vent 23, which preferably is in alignment with channel 22, extends downwardly from chamber 19. All of the foregoing structural features have been described fully in the previously cited co-pending application. They are essential to the operativeness of body 10 in its sound transmission function and render said body a three-way transmitter. Sound waves entering channel 21 from the telephone receiver, and which may be either the voice waves produced by the local user of the sound transmission body or those of the party at the other end of the line, are transmitted through chamber 19 and channel 22 to recorder microphone 16. The same voice waves are conducted by channel 20 from chamber 19 to the ear of the local user. Thirdly, voice waves emanating from the vocal cords of the local user may be conducted by bone conduction to body 10 and thence through the resonant mass of said body to sound chamber 19, whence transmission to the recorder microphone is completed by channel 22.

The means by which body 10 may be supported by the user's head may take various forms, but I prefer to adopt the headband 24, whose manner of use is disclosed in Fig. 1, together with suspension means dependent from said headband. This headband has a socket 25 at one end in which a vertical extension rod 26 of the suspension means is frictionally fitted for longitudinal sliding and rotary adjustment. Rod 26 has a spring fork 27 affixed to its lower end. The legs of this fork 27 are adapted to straddle body 10 and to be secured detachably to the ends of diametrically aligned opposite trunnions 28, which project horizontally from the sides of body 10, by clamping screws 29. These screws are threaded into the ends of trunnions 28 and are adapted, when screwed in tight, to bind the legs of fork 27 against the trunnion ends in a manner which will secure body 10 against rotation on the horizontal axis of the swivel means, of which the vertical axis is afforded by the rotatable fit between rod 26 and socket 25. The swivel feature not only permits even contact of alternate earpiece 12 of body 10 against the user's ear, but also permits inversion of body 10 when desired. Detachment of body 10 from its swivel mount for inversion or any other purpose may be accomplished by removing screws 29 and springing the fork legs outwardly until clear of trunnions 28, as shown in an exaggerated manner in Fig. 6.

When body 10 has been donned by the user, with recorder microphone 16 attached, the sound recorder (not shown) may be readied for the recording of any conversation which enters the sound channels in body 10. Then, by grasping a telephone receiver with one hand in the customary manner and lifting it from the cradle or hook, as the case may be, the face annulus of the receiver may be placed in free and unrestrained contact with abutment face 13 of body 10 in the same simple manner that the receiver is pressed against the user's own ear when listening to unrecorded telephone conversation.

When sound transmission body 10 is mounted in the originally contemplated manner, as shown in Figs. 1 to 6 inclusive, with recorder microphone 16 on top, the said body will be top-heavy, so it may be desirable to tighten clamping screws 29 and thereby lock body 10 against accidental inversion, especially when headband 24 is to be put on and taken off frequently. Before tightening screws 29, body 10 should be placed in comfortable form-fitting position against the user's ear and face, if to be used continually by the same person. However, while the headband is being worn and body 10 is bearing against the ear, accidental inversion is impossible, so, if the device is to be kept on the head for a prolonged period of time, it will be entirely practicable to loosen screws 29. Regardless of the general position of body 10, slight angular adjustments from time to time will afford relief from too prolonged pressure on the same ear and facial areas, which can affect local nerve centers and produce extreme discomfort. When such adjustments are made, it should prove desirable to fix body 10 in each new position. The friction of the bearing of rod 26 in socket 25 will tend to resist angular change on the vertical swivel axis, but it will be necessary to make use of screws 29 for temporarily checking motion on the horizontal axis. In order that the wearer may make adjustments of this kind without removing the device and without having to use a screw-driver, it would be entirely within the scope of my invention to substitute screws having directly manipulatable rotating means, such as knurled heads (not shown).

Whenever body 10 is inverted intentionally to make a receiver-supporting ledge out of flanges 14, as shown in Figs. 7 and 8, the said body will tend to retain that position due to the lowering of the center of gravity caused by shifting of microphone from top to bottom position.

As shown in Fig. 6, the guide flanges 14 may be omitted without departing from the scope of the invention, if such elimination should be found to be desirable for any reason.

It should now be apparent that the improved construction of my device simplifies its use and affords opportunity for countless variations in the manner in which it may be worn to suit the convenience and comfort of the user.

Having thus described the invention, what I claim as new and desire to secure by Letters Patent is:

1. A portable sound transmission device for use in recording telephone conversation comprising a body adapted to be supported in contiguity to the user's ear in the position usually occupied by the earpiece of a telephone receiver, an earpiece provided on said body for direct ear contact, an abutment face formed exteriorly on said body to receive application of the earpiece of a telephone receiver, a seat provided on said body to receive application of a recorder microphone in close proximity to the body earpiece and abutment face, said body being provided with an internal acoustical sound chamber communicating with the said body earpiece, abutment face and microphone seat whereby sound waves of articulate speech produced by the diaphragm of the telephone receiver at the abutment face will be transmitted through said sound chamber to the body earpiece and microphone seat by air conduction and without utilizing or affecting electrical energy of the telephone circuit, a head-engageable supporting member, and suspension means connecting the said body with the supporting member.

2. A portable sound transmission device for use in recording telephone conversation as defined in claim 1, wherein the body has a receiver-supporting ledge projecting outward from the underside of the abutment face thereof, whereby the weight of the telephone receiver will be partly head-supported when applied to the abutment face.

3. A portable sound transmission device for use in recording telephone conversation as defined in claim 2, wherein the suspension means for the body includes a vertical rod rotatably mounted on the head-engageable supporting member, a fork provided at the lower end of the vertical rod and adapted to straddle the body, and pivoting members connecting said forks to the body on a horizontal axis, whereby the body is invertible and reversible to shift the receiver-supporting ledge between lower and upper outwardly projecting positions.

4. A portable sound transmission device for use in recording telephone conversation as defined in claim 3, wherein the pivoting members for the body are in the form of clamping screws adapted to secure the said body fixedly in the fork of the suspension means in angularly adjusted position.

SCOTT B. BERKELEY.

REFERENCES CITED

The following references are of record in the file of this patent:

UNITED STATES PATENTS

| Number | Name | Date |
|---|---|---|
| 847,691 | Rector | Mar. 19, 1907 |
| 911,438 | Peters | Feb. 2, 1909 |
| 966,467 | Nichols | Aug. 9, 1910 |
| 1,249,962 | Lundgren | Dec. 11, 1917 |
| 1,560,303 | Pope | Nov. 3, 1925 |
| 1,569,398 | Scher | Jan. 12, 1926 |
| 1,599,961 | Hall | Sept. 14, 1926 |
| 2,408,720 | Olger | Oct. 8, 1946 |

FOREIGN PATENTS

| Number | Country | Date |
|---|---|---|
| 452,186 | Great Britain | Aug. 18, 1936 |